United States Patent
Haakmeester et al.

(10) Patent No.: US 12,404,630 B2
(45) Date of Patent: Sep. 2, 2025

(54) METHOD FOR THE PRODUCTION OF A MICROPOROUS POLYMER COATED FABRIC

(71) Applicant: Betjo Beheer B.V., Ootmarsum (NL)

(72) Inventors: Brian Haakmeester, Ootmarsum (NL); Pieter Gerardus Antonius Maria Van Der Maas, Ootmarsum (NL)

(73) Assignee: Betjo Beheer B.V., Ootmarsum (NL)

( * ) Notice: Subject to any disclaimer, the term of this patent is extended or adjusted under 35 U.S.C. 154(b) by 345 days.

(21) Appl. No.: 17/916,650

(22) PCT Filed: Apr. 16, 2021

(86) PCT No.: PCT/NL2021/050247
§ 371 (c)(1),
(2) Date: Oct. 3, 2022

(87) PCT Pub. No.: WO2021/210983
PCT Pub. Date: Oct. 21, 2021

(65) Prior Publication Data
US 2023/0167602 A1    Jun. 1, 2023

(30) Foreign Application Priority Data

Apr. 17, 2020  (NL) ..................................... 2025360

(51) Int. Cl.
*D06N 3/14*   (2006.01)
*A47L 13/16*  (2006.01)
(Continued)

(52) U.S. Cl.
CPC ................ *D06N 3/14* (2013.01); *A47L 13/16* (2013.01); *C09D 7/20* (2018.01); *C09D 7/61* (2018.01); *C09D 7/63* (2018.01); *C09D 175/04* (2013.01); *D06N 3/0061* (2013.01); *D06N 3/0063* (2013.01); *D06N 3/0088* (2013.01); *C08K 2003/262* (2013.01); *C08K 5/09* (2013.01); *D06N 3/0006* (2013.01); (Continued)

(58) Field of Classification Search
CPC ... D06N 3/14; C09D 7/61; C09D 7/20; C09D 7/63; C09D 175/04; A47L 13/16
See application file for complete search history.

(56) References Cited

U.S. PATENT DOCUMENTS 4,082,878 A       4/1978  Boe et al.
2018/0208722 A1*  7/2018  Tetsui .................... C08G 18/76

FOREIGN PATENT DOCUMENTS

CN    108755169 A    11/2018
EP     3327066 A1     5/2018
(Continued)

*Primary Examiner* — Nathan T Leong
(74) *Attorney, Agent, or Firm* — Christian S. Hans; Bret E. Field; Bozicevic, Field & Francis LLP

(57) ABSTRACT

The present inventions relates to a low solvent based method for the production of a microporous polymer coated fibrous fabric, comprising the steps of contacting the fabric with a composition dispersed in an aqueous medium thereby coating the fabric with the composition, and contacting the coated with a coagulation solution and drying of the fabric, crosslinking the polymer resin. Furthermore, the present invention relates to a cleaning cloth comprising a microporous polymer coating obtained by the method.

12 Claims, 4 Drawing Sheets

Figure 1:
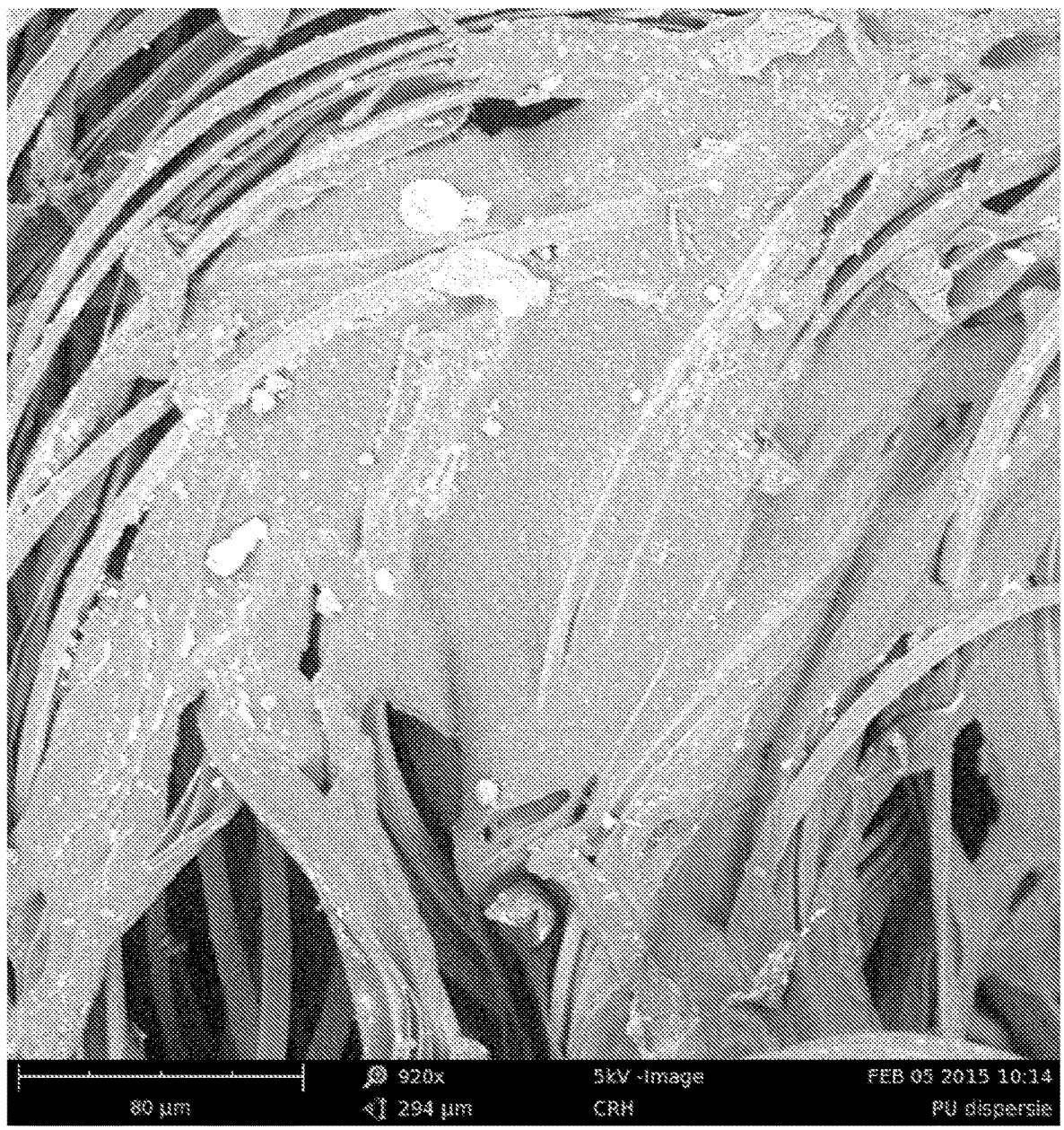

(51) Int. Cl.
*C09D 7/20* (2018.01)
*C09D 7/61* (2018.01)
*C09D 7/63* (2018.01)
*C09D 175/04* (2006.01)
*D06N 3/00* (2006.01)
*C08K 3/26* (2006.01)
*C08K 5/09* (2006.01)

(52) U.S. Cl.
CPC .......... *D06N 3/0009* (2013.01); *D06N 3/0011* (2013.01); *D06N 2203/068* (2013.01); *D06N 2205/24* (2013.01); *D06N 2209/141* (2013.01); *D06N 2209/1635* (2013.01); *D06N 2211/08* (2013.01)

(56) References Cited

FOREIGN PATENT DOCUMENTS

WO         WO0233001 A1    4/2002
WO         WO2002033001    *   4/2002

* cited by examiner

METHOD FOR THE PRODUCTION OF A MICROPOROUS POLYMER COATED FABRIC

The present inventions relates to a low solvent based method for the production of a microporous polymer coated fibrous fabric, comprising the steps of contacting the fabric with a composition dispersed in in an aqueous medium thereby coating the fabric with the composition, and contacting the coated with a coagulation solution and drying of the fabric, crosslinking the polymer resin. Furthermore, the present invention relates to a cleaning cloth comprising a microporous polymer coating obtained by the method.

In the household, car-care market and in the professional cleaning various types of cleaning cloths are known, which serve for the cleaning of office furniture, vehicles, floors, restrooms or other surfaces. Most cleaning cloths are comprised of a simple monolayer textile base. Using microfiber cloths for cleaning can dramatically reduce the amount of cleaning detergents you use, and depending on dry or damp use of the cloth many different cleaning tasks, like for instance dusting surfaces, cleaning windows and mirrors, and shining stainless steel are possible.

Dirt and liquid absorption and release are important properties of a cleaning cloth, during the cleaning process using the cloth. Water, often with soap/detergents dissolved therein, is used to dissolve the dirt and dust and to bind these to the texture surface and fibers of the cloth. Furthermore, the sliding properties and softness of the cloth are important. An optimal cleaning cloth is flexible in both wet and dry conditions and durable over time, producing a smooth, dry and clean finish.

To increase the cleaning performance cleaning cloths (often a textile substrate or other fabric) may be coated for example with a thermoplastic polyurethane (PU) coating, a polyvinylalcohol (PVA) coating or a latex coating. In case of a PU coating, this coating is in general applied using solvent based application, wherein the substrate is immersed in a polar aprotic solvent (for instance: dimethylformamide (DMF), dimethylsulfoxide (DMSO), N-Methyl-2-pyrrolidone (NPM), Dimethylacetamide (DMAc)), comprising the PU polymer resin, where after the solvent is washed out and the polymer resin will remain on the substrate, also known as wet-coagulation process. The basic principle of the coagulation process is based on the use of a suitable solvent/non-solvent pair for the PU polymer resin. Use of these organic volatile solvents in the wet-coagulation (comprising the polymeric resin completely dissolved herein) ensures direct impregnation and coating of the fabric, such as a cleaning cloth, with the polymeric resin. The result is a finished product with optimal physical-mechanical characteristics and optimal bonding between the polymer resin and (micro-) fiber of the fabric and resulting in a cloth with a porous polymer microfoam having micropores.

Furthermore, in a second step, the polymer coated fabric or substrate is passed through DMF/water baths, where the proportion of water is increased stepwise and precipitation of the polyurethane on the cloth/substrate occurs. A disadvantage of the process is the use of large amounts of organic solvent and that the process leads to high volumes of waste water, high residual chemicals in the produced cloth and high health risks to the employee. The process requires that the used organic solvents must be recovered for reuse in the production process and/or disposed of for safeguarding the environment, and thus requires considerable labour and raises industrial costs.

In the process of applying a PVA coating to a substrate, a textile is impregnated-coated with an aqueous PVA solution which is subsequently precipitated and then crosslinked by using a high concentrated formalin solution, thereby creating a microporous polyvinyl-formal (formalised PVA) micro foam on both sides of the fabric. A disadvantage of this process is the use of large amounts of inorganic salts and formaldehyde that end up in high volumes in waste water, providing high health risks to employees. The waste water created by this process will be partly treated by waste water treatment systems but still a large part of the inorganic salts and chemicals will be released into the environment making it a burden to the environment.

In order to minimize the exposure of employees to organic solvents and/or harmful chemicals, reduce waste streams during production, and produce a product having a greener footprint, the use of large amounts of volatile organic solvents and/or harmful chemicals during production needs to be reduced to a minimum or even avoided. For safety reasons, ease of use, and environmental considerations, the use of volatile organic solvents and/or harmful chemicals needs to be reduced or even to develop solvent-free methods and systems to manufacture coatings and adhesives for household products, such as cleaning cloths.

Solvent-free processes such as coating a textile with a mechanically foamed synthetic polymer (often Latex) on both sides of a textile substrate are available, resulting in a cleaning cloth having a coating layer with good drying capabilities, however the disadvantage is that the coating will also cover the textile structure and fibers of the cloth, thereby reducing the cleaning functionality of the cloth drastically. For example, the fibers of a microfiber cleaning cloth made of conjugated polyester and polyamide provides for a good cleaning ability of fatty and grease substances due to the microfiber properties of the fabric being able to bind such substances. However, the challenge is to obtain micropores in the polyurethane dispersion film during the coating of the textile, without completely covering the textile structure and fibres. The porous microfoam coating provides the textile advantageous properties such as producing a smooth, dry and clean finish on a wiped surface. The current polyurethane dispersion application techniques focus more on the aesthetic look and feel of the fabric and the applied layer/coating. For example the synthetic leather coating of the car interior is a polyurethane dispersion applied coating on a substrate and does not comprise the porous microfoam structure of the coating comprising the micropores due to the film forming of the polyurethane and such a coating of method of coating is therefore not functional for cleaning purposes.

Considering the above, there is a need in the art for a low solvent, more environmental friendly, and economical method for the production of a fibrous fabric having a porous polymer micro-foam coated surface, wherein the resulting porous polymer micro-foam coated fabric is of similar or even improved quality in respect to the optimal physical-mechanical characteristics when compared to coated fabrics produced by means of a high volatile organic solvent based method or method using large amounts of harmful chemicals. In addition there is a need in the art for a porous micro-foam polymer coated cleaning cloth with improved cleaning characteristics.

It is an object of the present invention, amongst other objects, to address the above need in the art. The object of present invention, amongst other objects, is met by the present invention as outlined in the appended claims.

Specifically, the above object, amongst other objects, is met, according to a first aspect, by the present invention by a method for the production of a microporous polymer coated fabric, wherein the method comprises the steps of;
- a) contacting the fabric with a composition dispersed in an aqueous medium, preferably water, thereby coating the fabric with the composition, wherein the composition is comprised of 1 to 20 wt %, preferably 2 to 15 wt %, more preferably 3 to 12 wt %, most preferably 5 to 10 wt % of an anionic polymer resin comprising one or more carboxylic acid groups, and 0.1 to 5 wt %, preferably 0.3 to 2 wt %, more preferably 0.5 to 1.5 wt % of a cationic solvent based on the total weight of the composition,
- b) contacting the coated and/or impregnated fabric with a coagulation solution, wherein said coagulation solution is an acid solution, thereby precipitating the polymer resin on and/or in the fabric,
- c) drying of the fabric and crosslinking the polymer resin.

The anionic polymer in the composition should be within a concentration of 1 to 20 wt %, preferably 2 to 15 wt %, more preferably 3 to 12 wt %, most preferably 5 to 10 wt % based on the total weight of the composition. When the concentration of polymer resin is above 20 wt % the amount of polymer in the coating will be too high resulting in a stiff and hard product, having a very dense porous micro-foam structure blocking the underlying microfiber structure of the fabric, which is less suitable for cleaning purposes. Furthermore, at too high polymer application the coated fabric will not be able to absorb moist, since the surface will become too hydrophobic. In case less than 1 wt % of polymer resin is being used, the dispersion will not be stable since polymer particles in the dispersion will be too far from each other to produce a proper micro-foam coating on the surface of the fabric and/or produce porous surface having a pore size that is too large for a proper cleaning functionality of the product. The method of the present invention provides to be especially useful for the production of durable (non-disposable) cleaning cloths. Wherein the cloth has good cleaning capabilities, such as water absorption, dirt collection, streak free wiping and releasing dirt under rinsing water.

The cationic solvent in the composition should be within a concentration of 0.1 to 5 wt %, preferably 0.3 to 2 wt %, more preferably 0.5 to 1.5 wt % based on the total weight of the composition. When the concentration of cationic solvent in less than 0.1 wt % the polymer dispersion will become unstable since the carboxylic acid groups of the anionic polymer resin cannot be sufficiently neutralized due to the lack of cationic groups available. To maintain a low solvent method for the production of a microporous polymer coated fabric, preventing high volatile organic solvents being used and using large amounts of harmful chemicals, the concentration of the cationic solvent should not exceed 5 wt % based on the total weight of the composition.

The one or more carboxylic acid groups act as internal stabilization groups of the polymer resin that interact with the catalytic solvent, and enables the polymer resin to be dispersed in water. The solvent acts as a counter-ion to the acid in the polymer backbone, allowing for the formation of polymer particles in water, i.e. ionizing the carboxylic acid of the polymer. The counter ion neutralizes the acid in the polymer, forming an ionized acid-base pair that makes it dispersible. Without being ionized, it would not have the required affinity for water necessary for creating a polymeric dispersion. The solvent serves as internal stabilizing agent and are of cationic type (e.g. trimethylamine or quaternary ammonium salts).

The present method provides a simple and short (i.e. a coated cloth can be produced within 10 minutes) process without the need to further wash or further process the porous micro-foam polymer coated cloth. In contrast to current methods to produce coated fabric wherein during solvent coagulation a proportion of solvent (~100 ppm) remains in the coated fabric, the method of present invention produces a fabric comprising no solvent residues in the coated fabric and produces considerable lower amounts of harmful or toxic waste streams, since there is limited use organic volatile solvents (at most of 5 wt % on the total weight of the composition is solvent), producing a cleaning cloth having a greener footprint. In solvent based processes, the solvent is being recycled, wherein large amounts of waste water in the process comprising up to 40 wt % of solvent is distilled. This process takes a lot of energy and produces a large imprint in terms of $CO_2$ emissions and is very costly in comparison to the method of present invention.

Furthermore, the method of present inventions leads to optimal desired chemical and physical-mechanical characteristics (e.g. strong PU/(micro-) fiber bond) of the product having a porous micro-foam polymer coating which cannot be obtained via any of the known processes without using such low amounts of solvents. The cleaning properties of the cleaning cloth produced via the method of present inventions are comparable to a cleaning cloth having a porous micro-foam polymer coating produced via a solvent based method.

According to another preferred embodiment, the present invention relates to the method, wherein the anionic polymer resin is selected from the group consisting of polyurethane, polyacrylate or polybutadiene, preferably polyurethane.

According to a preferred embodiment, the present invention relates to the method, wherein the catalytic solvent is selected from the group consisting of trimethylamine, dimethylethanolamine, sodium hydroxide, potassium hydroxide, ammonia, preferably trimethylamine.

According to a preferred embodiment, the present invention relates to the method, wherein the composition dispersed in water has a viscosity of between 100-5000 cP, preferably between 500-3500 cP, more preferably between 1500-3000 cP. A viscosity of below 100 cP will result in full impregnation of the fabric, wherein the fabric will "pick up" too much polymer and will penetrate through the whole fabric material resulting in decreased cleaning functionality of the coated fabric. During coating a certain degree of impregnation occurs into the fabric, depending on the viscosity of the polymer resin dispersion. Ideally, a small degree of impregnation of the fabric with the polymer resin occurs providing an improved mechanically fixation to the fibers of the fabric, and the top layer of the fabric is coated in order to maintain proper cleaning functionality of the fabric having sufficient hydrophilic properties including a porous micro-foam structure of the polymer coating.

According to a preferred embodiment, the present invention relates to the method wherein the thickness of the microporous polymer coating is at most 0.5 mm, preferable at most 0.1 mm, more preferably at most 0.05 mm.

According to another preferred embodiment, the present invention relates to the method, wherein the acid solution has a pH of between 1 to 5, preferably 2 to 4. The acid solution should not exceed a pH of 5, since this will negatively affect the coagulation process.

According to another preferred embodiment, the present invention relates to the method, wherein the acid solution is comprised of one or more acids selected from group consisting of acetic acid, citric acid, phosphoric acid or mixtures thereof. In general most organic acids may be used for coagulation; however for optimal coating preferably a weak organic acid is used, such as acetic acid or citric acid.

According to yet another preferred embodiment, the present invention relates to the method wherein the acid solution is comprised of 0.5 to 15 wt %, preferably 1 to 10 wt %, more preferably 1 to 5 wt % of acid based on the total amount of acid solution. At acid concentrations above 15 wt % the polymer resin will remain "sticky" and will result in further treatment of the coated fabric to wash out excessive polymer resin from the coated fabric. Furthermore, when drying the coated fabric being coagulated with high acid solutions at elevated temperatures (i.e. 130° C.) will result in an unwanted delayed coagulation reaction (will negatively affect pore formation) and furthermore result in a fabric comprising acid burns.

According to another preferred embodiment, the present invention relates to the method, wherein the acid solution is further comprised of a 1 to 30 wt % of a salt, preferably 5 to 20 wt %, more preferably 10 to 15 wt %, based on the total amount of acid solution. The addition of salt to the acid solution improves the coagulation process due to the increased electronegativity of the solution.

According to another preferred embodiment, the present invention relates to the method, wherein the salt is of one or more salts selected from the group consisting of sodium chloride, sodium sulfate, sodium carbonate, potassium chloride, potassium sulfate, potassium carbonate, magnesium chloride, magnesium sulfate, calcium chloride or calcium sulfate, preferably sodium chloride or sodium sulfate.

According to a preferred embodiment, the present invention relates to the method, wherein the composition is further comprised of a blowing agent, wherein the blowing agent is preferably sodium bicarbonate. The added sodium bicarbonate reacts on contact with the acid during coagulation and makes the polymer coating even more porous due to the $CO_2$ being released during the process.

According to yet another preferred embodiment, the present invention relates to the method, wherein the composition is further comprised of a crosslinker selected from the group consisting of aziridine, isocyanate, melamine and polycarbodiimide, preferably polycarbodiimide. The crosslinker is added to the composition comprising a polymer resin dispersed in water. The crosslinker is used to improve the wash resistance of the coated fabric material and improve mechanical binding of the polymer to the fabric due to improved polymerization of the polymer coating.

According to another preferred embodiment, the present invention relates to the method, wherein drying of the fabric and crosslinking the polymer resin is performed at the highest at 180° C., more preferable at 140° C., most preferably at 120° C. for at least 1 minute, more preferably at least 5 minutes, most preferably at least 10 minutes. At the indicated temperatures the polymer is crosslinked and fixated to the fabric. If the temperature during crosslinking is too low, insufficient or partial cross-linking will take place. If the temperature is too high or the drying time is too long, the polymer will burn as well as the textile, resulting in a hard, inflexible and/or burnt fabric.

According to a preferred embodiment, the present invention relates to the method, wherein the fabric is comprised of fibers selected from the group consisting of cotton, viscose, rayon, lyocell, wool, silk, linen, polyamide, polyester, hydrophobized viscose, modified polyester, polyester blend fabric, polyamide blend fabric, polyacrylonitrile, triacetate, acetate, polycarbonate, polyvinylalcohol, polyolefins, polyethylene, polypropylene, polyvinyl chloride, and mixtures thereof, preferably viscose, rayon cotton or blends of polyester and polyamide.

According to another preferred embodiment, the present invention relates to the method, wherein the step a) contacting is done by one or more selected from the group consisting of knife coating, fixed gap roller coating, brush-application, gravure printing, rotary printing, screen printing, stationary screen printing, dipping, padding, lick-roll coating, spray coating, preferably knife coating or fixed gap roller coating. Coating and impregnation of the fabric by contacting the fabric with the polymer dispersion can be accomplished through any well-known coating or impregnation procedure, however knife coating or fixed gap roller coating are preferred.

According to another preferred embodiment, the present invention relates to the method, wherein the step b) contacting is done by one or more selected from the group consisting of dipping, spraying, lick-rolling, gravure rolling.

According to yet another preferred embodiment, the present invention relates to the method, wherein after step b), the coated and/or impregnated fabric is being processed and/or washed with water or an alkaline solution for removing superfluous composition or unwanted chemicals from the fabric. Removal of superfluous composition can be done by several techniques, including pressing techniques or scraping techniques.

According to a preferred embodiment, the present invention relates to the method, wherein step c is performed using hot air, or UV-drying. Most preferably by hot air in an oven since this provides the best microporous foam structure.

According to another preferred embodiment, the present invention relates to the method, wherein step a and b are performed at room temperature, preferably at 20-25° C.

According to yet another preferred embodiment, the present invention relates to the method, wherein the composition further comprises one or more additives selected from the group consisting of wetting agent, dulling agent, plasticizer (softener), pigment, defoamer or foaming agents, foam stabilizers, foam boosters, expendable microspheres, fillers, thickening and rheology agents.

The present invention, according to a second aspect, relates to a cleaning cloth comprising a porous polymer coating obtained by the method of present invention, wherein the cloth is comprised of between 5 to 50 wt %, preferably between 10 to 30 wt %, of microporous polymer coating based on the total weight of the cloth.

According to another preferred embodiment, the present invention relates to the cleaning cloth, wherein the cleaning cloth comprises a fibrous structure and a porous polymer coating, wherein the fibrous structure remains partially exposed at the surface of the cloth. The cleaning cloth comprises a porous polyurethane coated fibrous fabric, wherein the fibers or filaments of the fibrous fabric structure cleaning cloth remain partially exposed at the surface of the cleaning cloth. Per mm2 of cleaning cloth surface at least 4, more preferably at least 5, more preferably at least 6, most preferably at least 7 fibers are present at the surface that are not fully covered with polymer coating, i.e. are not fully coated with the porous polymer covering the whole fiber at the surface of the cleaning cloth. The number of uncoated fibers can be determined with a scanning electron microscope (SEM) of the surface of a microfiber textile. When the cleaning cloth of present invention is being used for cleaning of a surface and is pressed against said surface with a force, which is in general between 0.05 and 0.5 N/cm2, the porous polymer coated surface of the cleaning cloth as well as the fibrous structure of that cloth (i.e. areas that are not coated) are in contact with the surface to be cleaned, improving the cleaning properties of the cleaning cloth.

According to another preferred embodiment, the present invention relates to the cleaning cloth, wherein the polymer coating is comprised of an anionic polymer resin comprising one or more carboxylic acid groups.

According to another preferred embodiment, the present invention relates to the cleaning cloth, wherein at least 40 wt %, preferably at least 50 wt %, more preferably at least 65 wt %, most preferably at least 80 wt % of the polymer is present as thermoset polymer, based on the total of microporous polymer coating present on the cloth. Due to the crosslinking process and the further addition of a crosslinker in step c, at least part of the polymer coating is irreversibly hardened (cured) into a thermoset coating and therefore no longer soluble in solvents such as DMF. This is in contrast to present production processes for coating of cleaning cloths (solvent-based), the polymer remains a thermoplastic and therefore always 100% soluble in DMF. The cleaning cloths of present inventions are very durable and washable in washing machines, high hydrolysis resistance of the cloths is very important, because the polymers that form the coating will always form (partly) thermoset polymers.

According to a preferred embodiment, the present invention relates to the cleaning cloth, wherein the cleaning cloth contains no traces of aprotic solvent, for example one ore more aprotic solvents selected from the group consisting of DMF, NMP, DMSO, and DMAc.

According to another preferred embodiment, the present invention relates to the cleaning cloth, wherein the thickness of the porous polymer coating is at most 0.5 mm, preferable at most 0.1 mm, more preferably at most 0.05 mm.

According to yet another preferred embodiment, the present invention relates to the cleaning cloth, wherein the porous polymer coating is comprised of micropores having an average diameter of between 1 to 100 µm, preferably between 2 to 50 µm, more preferably between 2.5 to 25 µm. The microporous polymer coating of the cleaning cloth may have partly closed and open pores.

According to yet another preferred embodiment, the present invention relates to the cleaning cloth, wherein the cleaning cloth is comprised of fibers selected from the group consisting of cotton, viscose, rayon, lyocell, wool, silk, linen, polyamide, polyester, hydrophobized viscose, modified polyester, polyester blend fabric, polyamide blend fabric, polyacrylonitrile, triacetate, acetate, polycarbonate, polyvinylalcohol, polyolefins, polyethylene, polypropylene, polyvinyl chloride, and mixtures thereof, preferably viscose, rayon cotton or blends of polyester and polyamide.

According to a preferred embodiment, the present invention relates to the cleaning cloth, wherein the fibrous structure is of a knit textile fabric, a woven textile fabric or a nonwoven textile fabric.

According to yet another preferred embodiment, the present invention relates to the cleaning cloth, wherein the cloth remains flexible having an average bending length over both directions of the cloth between 2 and 10 cm, preferably 3 and 8 cm, more preferably 4 and 7 cm in a dry state as determined according to testing norm DIN-EN-ISO 9073-7:1995. A regular non coated textile cleaning cloth is very soft and flexible, however after coating the cloths with a polymer, the cloth obtains a certain degree of hardness and with some polymer resins also elasticity. The more polymer applied as coating, the stiffer the final cloth will be. Elasticity is very much a function of the thermoplastic characteristics of the applied polymer resin. Non thermoplastic polymer resins tent to provide a stiff product, whereas thermoplastic polymere resins provide a more elastic cloth. An optimal cleaning cloth with the optimal amount of polyurethane coating has the right balance between textile and coating which results in the good softness and elasticity in both dry and wet state. In the art, the flexibility of a textile fabric can represented with the bending length of the textile. The bending length is determined according to NEN EN ISO 9073-7:2005 which specifies a method for the determination of the bending length of fabrics and provides an equation for calculating the flexural rigidity of the fabric from the bending length.

The present invention will be further detailed in the following examples and figures wherein:

FIG. 1: Shows a photo obtained by a scanning electron microscope (SEM) of the surface of a microfiber textile to provide a detailed view of the surface topography and composition of the sample. The fabric has been produced by mechanically impregnation and coating of the microfiber textile with a low VOC synthetic polyurethane dispersion solution, in which the coating polymer was not coagulated with a coagulation solution, but instead after coating directly exposed to heat air and dried in a stenter. This results in a fabric having a non-porous film layer partly covering the textile fibrous structure and fibers of the cloth. The applied polyurethane resin forms a film between the fibers which is not porous, thereby providing a cleaning cloth having inferior cleaning functionality since the fibers of the fabric are not exposed anymore (no porous structure).

Figure 2:

FIG. 2: Shows a photo obtained by a scanning electron microscope (SEM) of the surface of a cleaning cloth to provide a detailed view of the surface topography and composition of the sample. The cleaning has been produced by high concentration solvent (DMF) based coagulation process, which results in a cloth having a polyurethane coating with a very fine, microporous structure, adding additional functionality to the fabric and especially suitable for cleaning.

Figure 3:
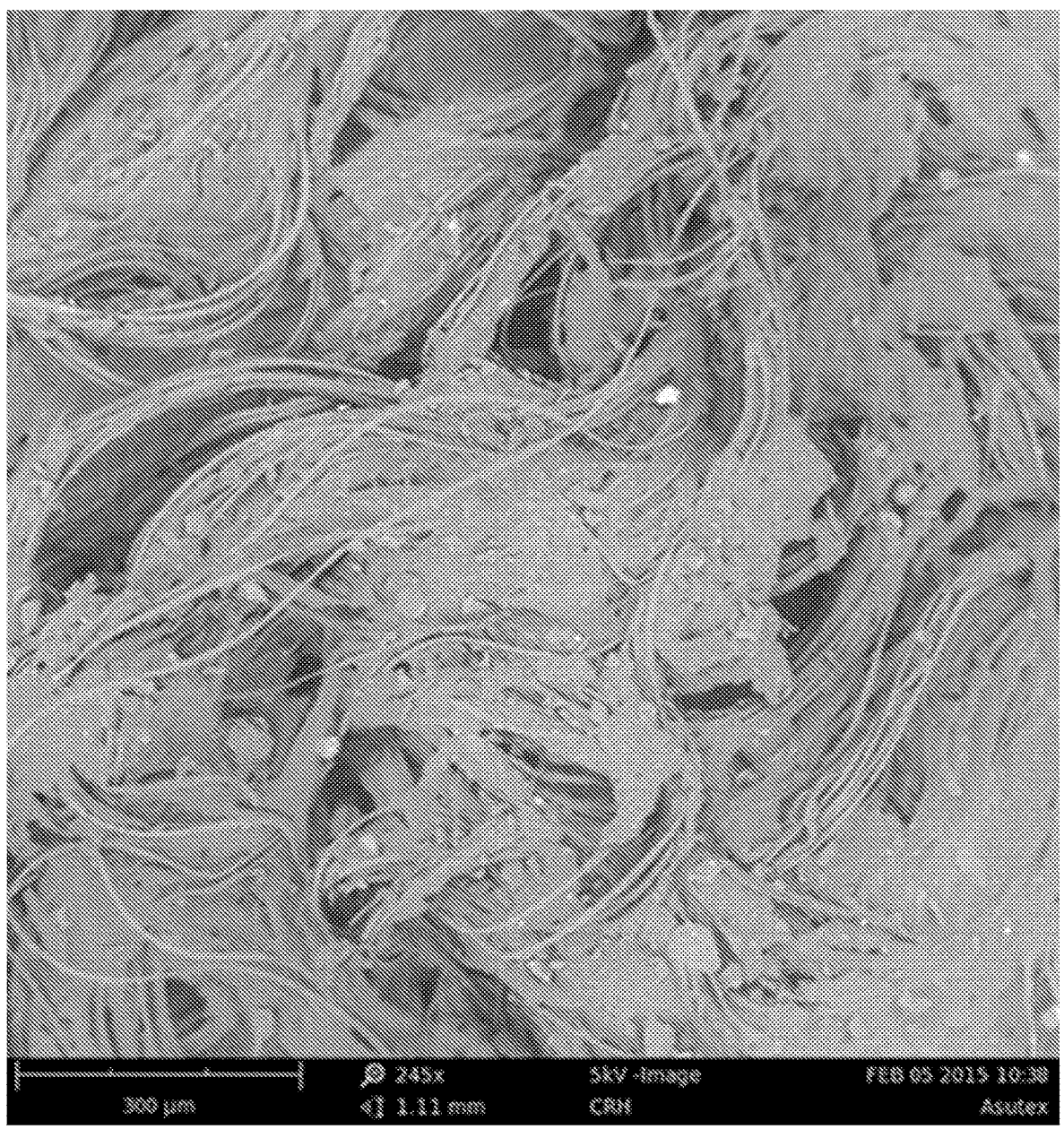

FIG. 3: Shows a photo obtained by a scanning electron microscope (SEM) of the surface of a cleaning cloth to provide a detailed view of the surface topography and composition of the sample. The fabric in the photo has been produced by the method of the present invention. The microfiber textile in this photo was impregnated with a low VOC synthetic polyurethane dispersion solution, hereafter the polymer resin was coagulated with the acetic acid coagulation solution. The cleaning cloth comprised a polyurethane coating having a microporous structure that is comparable to a cleaning cloth having a porous polymer coating produced via the high solvent based method of FIG. 2.

Figure 4:
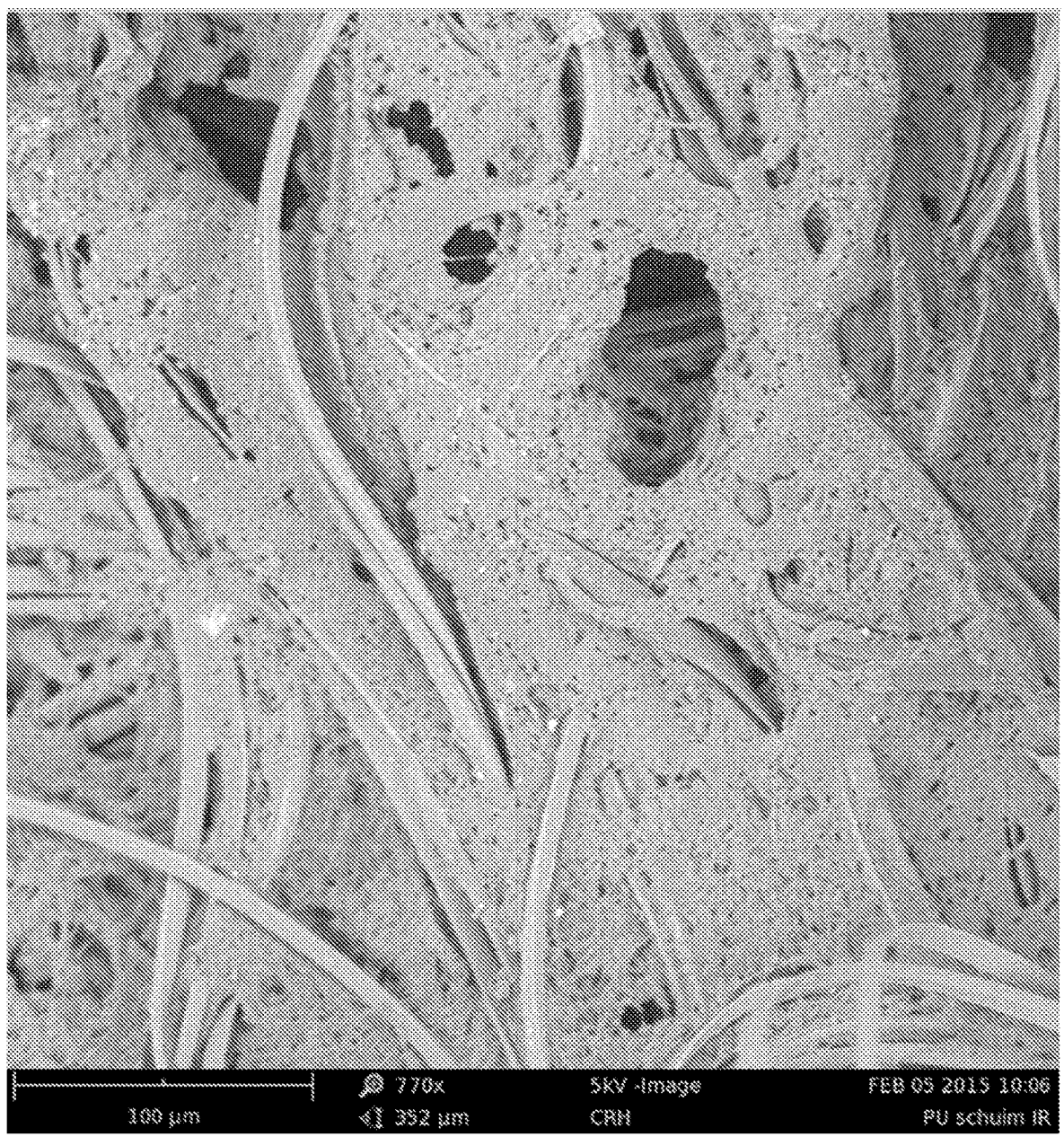

FIG. 4: Shows a photo obtained by a scanning electron microscope (SEM) of the surface of a cleaning cloth to provide a detailed view of the surface topography and composition of the sample. The fabric has been produced by the method of the present invention. The cotton woven textile in this photo was coated with a low VOC synthetic polyurethane dispersion mechanically foamed solution, hereafter the polymer resin was coagulated with the acetic acid coagulation solution. The photo shows that fibers of the fibrous textile structure cleaning cloth remain partially exposed at the surface of the cleaning cloth.

EXAMPLE A—PRODUCTION OF HYDROPHILIC SUBSTRATE WITH A SOFT AND PLEASANT FEEL

A composition (solution A) is prepared by mixing 40 parts by weight (pbw) polyurethane dispersion (EDOLAN WCP, Tanatex Chemicals), 10 pbw of dulling agent (EDOLAN XME01, Tanatex Chemicals), 3 pbw of crosslinker (ACRAFIX PCI, Tanatex Chemicals), 0.5 pbw of thickening agent (ACRACONC EP 6049, Tanatex Chemicals), 1.5 pbw of blowing agent (sodium carbonate) and 148 pbw of water. The viscosity of solution A was determined by using Brookfield Viscometer RVT to be of 100-1000 cps.

A textile substrate was immersed into solution A for approximately 10 to 15 seconds, and subsequently processed by a set of RVS rollers with a gap of 1.0 mm to remove excess solution. Then, the substrate is immersed in a coagulation bath comprised of an aqueous solution comprising 1 wt % of acetic acid solution for approximately 20 seconds, wherein the coagulation bath has a pH of approximately 2.7. The wet substrate is dried at 130° C. for approximately 3 minutes in a Monforts stenter frame to activate the crosslinker and blowing agent.

The substrate is immersed in a bath comprising a 1 wt % wetting agent (Serwet WH 170, Elementis), for 10 seconds. Subsequently the substrate is passed through a set of rollers at 3 bar and finally the substrate is dried at 130° C. for approximately 3 minutes in a Monforts stenter frame to dry. Textile substrates that have been subjected to the above described process provides a hydrophilic substrate (i.e. cleaning cloth) with a soft and pleasant feel.

EXAMPLE B—PRODUCTION OF HYDROPHILIC SUBSTRATE WITH SOIL-RELEASING, ANTISTATIC FINISH

A composition (solution B) is prepared by mixing 7 parts by weight (pbw) polyurethane dispersion (Hydran WLI-6309AR, (D!C)), 0.35 pbw of crosslinker (ACRAFIX PCI, Tanatex Chemicals), 1 pbw of plasticizer (PERSOFTAL ASN, Tanatex Chemicals) and 92 pbw of water. The viscosity of solution B was determined by using Brookfield Viscometer RVT to be of about 100 cps.

A textile substrate was immersed into solution B for approximately 10 to 15 seconds, and subsequently processed by a set of RVS rollers with a gap of 1.1 mm to remove excess solution. Then, the substrate is immersed in a coagulation bath comprised of an aqueous solution comprising 0.5 wt % of acetic acid solution for approximately 20 seconds, wherein the coagulation bath has a pH of approximately 2.92.

The wet substrate is subsequently immersed in a bath comprising a 1 wt % additive (TANAFINISH HPX), for 10 seconds. Subsequently the substrate is passed through a set of rollers at 3 bar, and finally the substrate is dried at 130° C. for approximately 3 minutes in a Monforts stenter frame to activate the crosslinker. Textile substrates that have been subjected to the above described process provides a hydrophilic substrate (i.e. cleaning cloth) with a soil-releasing, antistatic finish and prevents dirt or dust particles to adhere to the fibers of the substrate and can therefore be easily removed during laundering.

EXAMPLE C—DETERMINING THE BENDING LENGTH AND FLEXIBILITY OF THE CLEANING CLOTH WITH AND WITHOUT POLYMER COATING

For several cleaning cloths the bending length is determined according to NEN EN ISO 9073-7:2005 which specifies a method for the determination of the bending length of fabrics and provides an equation for calculating the flexural rigity of the fabric from the bending length. Table 1 shows the bending length measured according to DIN EN ISO 9073-7:1995 of different textile fabric without coating and with a polyurethane coating (PUD coating) obtained via the method of present invention. As control the bending length of a cleaning cloth (Vileda® PVAmicro) coated with a PVA coating according to standard solvent based coating techniques is used, being 10.23 cm average bending length over both cloth directions, resulting in that the cloth remains very stiff in dry condition. As can be observed, the cleaning cloths coated with the method of present invention remain flexible, only moderately increasing the bending length of the cloth after being coated.

TABLE 1

| Material | Average weight sample (g/m2) | Average bending length over both cloth directions(cm) |
|---|---|---|
| Warp Knitted 1 textile fabric | 270.24 | 1.58 |
| Warp Knitted 1 textile fabric with PUD coating | 325.36 | 3.62 |
| Warp Knitted 2 textile fabric | 273.89 | 1.39 |
| Warp Knitted 2 textile fabric with PUD coating | 318.14 | 3.79 |
| Warp Knitted 3 textile fabric | 270.24 | 2.44 |
| Warp Knitted 3 textile fabric with PUD coating | 378.02 | 3.91 |
| Weft Knitted 1 textile fabric | 212.75 | 1.44 |
| Weft Knitted 1 material with PUD coating | 233.09 | 3.44 |
| Waffel Woven Fabric | 353.38 | 3.26 |
| Waffel Woven Fabric with PUD coating | 336.42 | 6.72 |
| Plain Woven Fabric 1 | 214.86 | 2.44 |
| Plain Woven Fabric 1 with PUD coating | 214.88 | 3.79 |
| Plain Woven Fabric 2 | 186.02 | 2.02 |
| Plain Woven Fabric 2 material PUD coating | 276.64 | 4.34 |
| Plain Woven Fabric 3 base material | 119.38 | 2.02 |
| Plain Woven Fabric 3 with PUD coating | 198.48 | 4.54 |
| Needle punched non woven 1 textile fabric | 127.84 | 4.21 |
| Needle punched non woven 1 textile fabric with PUD coating | 330.59 | 4.68 |
| Needle punched non woven 2 textile fabric | 135.22 | 4.12 |
| Needle punched non woven 2 textile fabric with PUD coating | 193.54 | 7.09 |
| Warp Knitted 1 textile fabric with PVA Coating (Vileda ® PVAmicro) | 271.58 | 10.23 |

The invention claimed is:

1. A method for the production of a microporous polymer coated fibrous fabric, wherein the method comprises the steps of;
    a) contacting the fabric with a composition dispersed in in an aqueous medium thereby coating the fabric with the composition, wherein the composition is comprised of 1 to 20 wt % of an anionic polymer resin comprising one or more carboxylic acid groups, and 0.1 to 5 wt % of a cationic solvent, based on the total weight of the composition,
    b) contacting the coated fabric with a coagulation solution, wherein said coagulation solution is an acid solution, thereby precipitating the polymer resin on and/or in the fabric,
    c) drying of the fabric and crosslinking the polymer resin.
2. The method according to claim 1, wherein the anionic polymer resin is selected from the group consisting of polyurethane, polyacrylate or polybutadiene, and/or wherein the cationic solvent is selected from the group consisting of trimethylamine, dimethylethanolamine, quaternary ammonium salts, sodium hydroxide, potassium hydroxide, ammonia.
3. The method according to claim 1, wherein the composition dispersed in aqueous medium has a viscosity of between 100-5000 cP.

4. The method according to claim 1, wherein the thickness of the microporous polymer coating is at most 0.5 mm.

5. The method according to claim 1, wherein the acid solution has a pH of between 1 to 5, and/or wherein the acid solution is comprised of one or more acids selected from group consisting of acetic acid, citric acid, phosphoric acid or mixtures thereof and/or wherein the acid solution is comprised of 0.5 to 15 wt %, based on the total amount of acid solution.

6. The method according to claim 1, wherein the acid solution is further comprised of a 1 to 30 wt % of a salt, based on the total amount of acid solution.

7. The method according to claim 1, wherein the composition is further comprised of a blowing agent, and/or wherein the composition is further comprised of a cross-linker selected from the group consisting of aziridine, isocyanate, melamine and polycarbodiimide.

8. The method according to claim 1, wherein drying of the fabric and crosslinking the polymer resin is performed at the highest at 180° C. for at least 1 minute.

9. The method according to claim 1, wherein the fabric is comprised of fibers selected from the group consisting of cotton, viscose, rayon, lyocell, wool, silk, linen, polyamide, polyester, hydrophobized viscose, modified polyester, polyester blend fabric, polyamide blend fabric, polyacrylonitrile, triacetate, acetate, polycarbonate, polyvinylalcohol, polyolefins, polyethylene, polypropylene, polyvinyl chloride, and mixtures thereof.

10. The method according to claim 1, wherein the step a) contacting is done by one or more selected from the group consisting of knife coating, fixed gap roller coating, brush-application, gravure printing, rotary printing, screen printing, stationary screen printing, dipping, padding, lick-roll coating, spray coating, and/or wherein the step b) contacting is done by one or more selected from the group consisting of dipping, spraying, lick-rolling, gravure rolling, and/or wherein after step b), the coated and/or impregnated fabric is being processed and/or washed with water or an alkaline solution for removing unwanted chemicals from the fabric, and/or wherein step c is performed using hot air, or UV drying, and/or wherein step a and b are performed at room temperature.

11. The method according to claim 1, wherein the composition further comprises one or more additives selected from the group consisting of wetting agent, dulling agent, plasticizer, pigment, defoamer or foaming agents, foam stabilizers, foam boosters, expendable microspheres, fillers, thickening and rheology agents.

12. The method according to claim 1, wherein the salt is one or more selected from the group consisting of sodium chloride, sodium sulfate, sodium carbonate, potassium chloride, potassium sulfate, potassium carbonate, magnesium chloride, magnesium sulfate, calcium chloride or calcium sulfate, preferably sodium chloride or sodium sulfate.

* * * * *